United States Patent
Barbour et al.

(10) Patent No.: US 6,671,390 B1
(45) Date of Patent: Dec. 30, 2003

(54) AUTOMATED COLLECTION, PROCESSING AND USE OF SPORTS MOVEMENT INFORMATION VIA INFORMATION EXTRACTION FROM ELECTROMAGNETIC ENERGY BASED UPON MULTI-CHARACTERISTIC SPATIAL PHASE PROCESSING

(75) Inventors: Blair A. Barbour, Madison, AL (US); Richard J. Stilwell, Huntsville, AL (US); Jason M. Stilwell, Huntsville, AL (US)

(73) Assignee: Sport-X Inc., Huntsville, AL (US)

( * ) Notice: Subject to any disclaimer, the term of this patent is extended or adjusted under 35 U.S.C. 154(b) by 587 days.

(21) Appl. No.: 09/691,741

(22) Filed: Oct. 18, 2000

Related U.S. Application Data
(60) Provisional application No. 60/159,592, filed on Oct. 18, 1999.

(51) Int. Cl.[7] .................................................. G06K 9/00
(52) U.S. Cl. ........................ 382/103; 382/154; 382/276; 348/157; 348/169; 473/453; 702/40
(58) Field of Search ................................ 382/103, 154, 382/276; 348/148–157, 169–172; 359/333, 484; 702/40; 473/453; 345/632; 463/1; 342/28

(56) References Cited

U.S. PATENT DOCUMENTS

| 4,891,748 | A | | 1/1990 | Mann | |
|---|---|---|---|---|---|
| 5,875,030 | A | * | 2/1999 | Cooke et al. | 356/484 |
| 5,890,095 | A | * | 3/1999 | Barbour et al. | 702/40 |
| 6,011,874 | A | * | 1/2000 | Gluckstad | 382/276 |
| 6,031,545 | A | | 2/2000 | Ellenby et al. | |
| 6,042,492 | A | | 3/2000 | Baum | |
| 6,301,041 | B1 | * | 10/2001 | Yamada | 356/333 |
| 2002/0181761 | A1 | * | 12/2002 | Barbour | 382/154 |

* cited by examiner

Primary Examiner—Jayanti K. Patel
Assistant Examiner—Barry Choobin
(74) Attorney, Agent, or Firm—Pearne & Gordon LLP

(57) ABSTRACT

A system and method for tracking movement of a sports participant or a sports object associated with a sports activity, wherein in one example the system includes an article associated with the sports participant. The article provides a known spatial phase characteristic conveyed via electromagnetic energy. A receiver monitors the venue area within which the sports activity is occurring. Electromagnetic energy is received, wherein the received electromagnetic energy includes the electromagnetic energy from the article that conveys the spatial phase characteristic. The known spatial phase characteristic provided by said article is identified among the spatial phase characteristics of electromagnetic energy to locate the article. Physical movement of the sports participant is tracked by tracking the location of the article.

34 Claims, 10 Drawing Sheets

AUTOMATED COLLECTION, PROCESSING AND USE OF SPORTS MOVEMENT INFORMATION VIA INFORMATION EXTRACTION FROM ELECTROMAGNETIC ENERGY BASED UPON MULTI-CHARACTERISTIC SPATIAL PHASE PROCESSING

RELATED APPLICATIONS

This application claims the benefit of U.S. Provisional Application No. 60/159,592, filed Oct. 18, 1999.

FIELD OF THE INVENTION

The present invention is directed to the field of analysis of movement during a sports event. Also, the present invention is directed to an apparatus and method that extracts and exploits information conveyed within spatial phase (e.g., three-dimensional geometry) characteristics of electromagnetic energy (e.g., light), and is particularly directed to an apparatus and method that extracts data from multi-characteristic spatial phase processing as a novel approach to providing information useful for analysis of sports movement.

BACKGROUND OF THE INVENTION

In the various and wide ranging fields of sports, it is often desirable to observe, monitor, track, etc. the movement of one or more of the sports participants. The observation, etc. of the sports participant enhances enjoyment, aids in the regulation of the sports activity, allows diagnostic ability, etc. Many methods and devices have been developed to accomplish the observation, etc. of a sports participant.

For example, it is known to attach kinematic sensors to a sports participant. The kinematic sensors provide motion information that can be processed, and a computer-generated representation of the sports participant can be provided. However, it should be appreciated that attached sensors may have drawbacks, such as interfering with the movement of the sports participant.

Optical imaging has been used to observe, etc. sports participants. In many instances the obtained imagery is processed to determine movements of the sports participants. However, conventional imaging systems typically utilize the visible portion of light for image creation. Further, it may be difficult to identify/track plural sports participants and/or discrete portions (e.g., arms) of the sports participants due to adverse lighting conditions (e.g., low lighting or low contrast) or the like.

In one simple form of conventional imaging, videotape recording has long been used by persons, e.g., sports coaches, to help investigate sporting events. Coaches often use videotapes to analyze their own sports team as well as to analyze their opponent sports team. Often a coach can spend time breaking down portions of the videotaped activity and examining the shown activity for statistics, tendencies, strengths, and weaknesses.

However, the task of analysis may be large. For example, it has been reported by ESPN sources that the average NCAA Division I collage football coach spends roughly twenty hours per week watching and breaking-down videotape. The following table shows a few examples of the number of sports teams.

|            | Pro | College | H.S.    |
|------------|-----|---------|---------|
| Football   | 59  | 699     | 14,147  |
| Basketball | 41  | 1,987   | 16,763  |
| Hockey     | 135 | 1,640   | 1,462   |
| Baseball   | 147 | 847     | 14,486  |
| Others     | 12  | 2,339   | 69,816  |
| Total      | 394 | 7,512   | 116,674 |

When the total number of coaches for all sports is considered, it is easy to appreciate that a great amount of time routinely goes toward videotape analysis. It could be beneficial to have the ability to easily and accurately process analysis of sporting events.

Turning to some conventional imaging systems that are used to monitor sporting events, as well as other applications, many such conventional systems employ intensity-based techniques to handle electromagnetic energy proceeding from a source (e.g., an object). It is to be noted that, in distinction, spatial phase is intensity independent. Spatial phase characteristics of electromagnetic energy include characteristics of the plurality of polarizations (e.g., linear and circular) that are present within the electromagnetic energy.

As one type of utilization of polarization characteristics, polarimetry identifies, isolates, and/or uses a generalized polarization of electromagnetic energy. In the past, scientists have used polarimetry to filter imagery for specific applications. Polarization filters are used to collect polarization data, and classical polarization theory is used to determine one level of the spatial phase properties. However, overall spatial phase of a propagated electromagnetic wave can a significant amount of information that is indicative of unique features about the wave history. For example, properties of an electromagnetic wave change as the wave interacts with media and changes as the wave transverses a surface. Therefore, while some of the prior art is capable of performing limited polarimetry and other intensity-based applications, it is not capable, for the reasons discussed, of providing true, multi-dimensional, real-time spatial phase imaging.

The inventors have recognized that a spatial phase system would solve the above-mentioned problems and also go further into the complete analysis of the phase information that is contained in the electromagnetic energy. By the scientific analysis of all the radiation being transmitted, reflected, emitted and/or absorbed, one can determine its phase properties. The phase properties are those characteristics that convey information (e.g., an indication of the media through which a wave has passed) that could allow significant imaging abilities that lend themselves to heightened analysis ability. Along these lines, the inventors have recognized that spatial phase is a technology with tremendous benefit potential.

SUMMARY OF THE INVENTION

In accordance with one aspect, the present invention provides a system for tracking movement that occurs during a sports activity. The system includes an article, associated with the sport, which provides a known spatial phase characteristic conveyed via electromagnetic energy. Receiver means monitors the area within which the sports activity is occurring. The receiver means includes means for receiving electromagnetic energy. The electromagnetic energy includes the electromagnetic energy from the article that conveys the spatial phase characteristic. Means identifies the known spatial phase characteristic provided by the article among the spatial phase characteristics of electromagnetic energy to locate the article. Means tracks physical movement of the article by tracking the location of the article.

In accordance with another aspect, the present invention provides a system for tracking movement of a sports participant of a sports activity. The system comprises an article associated with the sports participant. The article provides a known spatial phase characteristic conveyed via electromagnetic energy. Receiver means monitors the venue area within which the sports activity is occurring. The receiver means includes means for receiving electromagnetic energy including the electromagnetic energy from the article that conveys the spatial phase characteristic. Means identifies the known spatial phase characteristic provided by the article among the spatial phase characteristics of electromagnetic energy to locate the article. Means tracks physical movement of the sports participant by tracking the location of the article.

In accordance with another aspect, the present invention provides a system for tracking movement of a sports participant of a sports activity. Receiver means monitors an area within which the sports activity is occurring. The receiver means includes means for receiving electromagnetic energy having a plurality of spatial phase characteristics. Means separates the plurality of spatial phase characteristics of the received electromagnetic energy. Means identifies spatially segregated portions of each spatial phase characteristic, with each spatially segregated portion of each spatial phase characteristic corresponding to a spatially segregated portion of each of the other spatial phase characteristics in a group. Means quantifies each segregated portion to provide a spatial phase metric of each segregated portion for providing a data map of the spatial phase metric of each separated spatial phase characteristic. Means associates at least one spatial phase characteristic with the sports participant. Means tracks the at least one spatial phase characteristic to identify movement of the sports participant.

In accordance with another aspect, the present invention provides a method for tracking movement that occurs during a sports activity. An article is provided. The article is associated with the sport and has a known spatial phase characteristic conveyed via electromagnetic energy. The area within which the sports activity is occurring is monitored. The monitoring includes receiving electromagnetic energy from the monitored area. The received electromagnetic energy includes electromagnetic energy from the article that conveys the spatial phase characteristic. The known spatial phase characteristic provided by the article is identified among the spatial phase characteristics of electromagnetic energy to locate the article. Physical movement of the article is tracked by tracking the location of the article.

In accordance with another aspect, the present invention provides a method for tracking movement of a sports participant of a sports activity. An article is associated with the sports participant. The article provides a known spatial phase characteristic conveyed via electromagnetic energy. The venue area within which the sports activity is occurring is monitored. The monitoring includes receiving electromagnetic energy from the monitored area. The received electromagnetic energy including the electromagnetic energy from the article that conveys the spatial phase characteristic. The known spatial phase characteristic provided by the article is identified among the spatial phase characteristics of electromagnetic energy to locate the article. Physical movement of the sports participant is tracked by tracking the location of the article.

In accordance with yet another aspect, the present invention provides a method for tracking movement of a sports participant of a sports activity. An area within which the sports activity is occurring is monitored. The monitoring includes receiving electromagnetic energy having a plurality of spatial phase characteristics. The plurality of spatial phase characteristics of the received electromagnetic energy is separated. The spatially segregated portions of each spatial phase characteristic are identified, with each spatially segregated portion of each spatial phase characteristic corresponding to a spatially segregated portion of each of the other spatial phase characteristics in a group. Each segregated portion is quantified to provide a spatial phase metric of each segregated portion for providing a data map of the spatial phase metric of each separated spatial phase characteristic. At least one spatial phase characteristic is associated with the sports participant. The at least one spatial phase characteristic is tracked to identify movement of the sports participant.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXEMPLARY EMBODIMENTS

Figure 1:
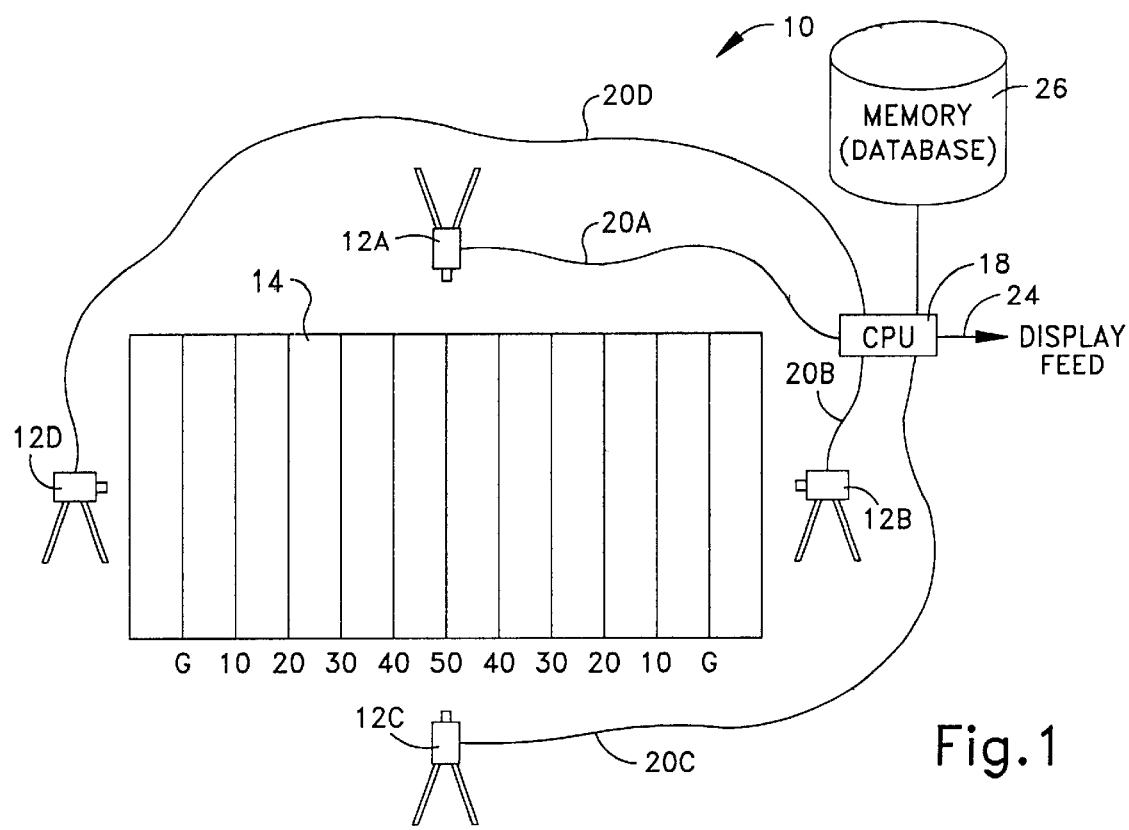
FIG. 1 is a schematic representation of an example system, in accordance with one aspect of the present invention, which utilizes electromagnetic spatial phase characteristics to discern sports participant information for a first example sport.

An example of a sports movement information discerning, utilizing, and presenting system 10 is schematically shown in FIG. 1. The system 10 utilizes electromagnetic (EM) spatial phase characteristics to discern sports movement information for a first example sport. In the example of FIG. 1, the sport is football.

Spatial phase is defined as the complete three-dimensional characterization of the propagation of the EM energy. Accordingly, spatial phase includes all phase and intensity terms. The propagation includes characteristics that convey information about the media and surfaces from which the EM energy proceeds. It is to be appreciated that propagation of EM energy may be passive and/or active (i.e., includes a source of EM energy).

One or more EM energy receiving devices 12A–12D receive EM energy from the venue 14 at which the sport is being performed, the sports participants (not shown in FIG. 1) at the venue, and the sports articles (not shown) at the venue. In the illustrated example, the venue 14 is a football field, the participants are football players, and the sports article is a football. Plural EM energy receiving devices 12A–12D permit several perspectives of the venue 14 and the participants and also aid in providing coverage of the entire venue. It should be noted that plural EM energy receiving devices 12A–12D are preferable for large venues such as the illustrated example of the football field, but that smaller venues could be accommodated by fewer EM energy receiving devices.

Also, in the illustrated example, the EM energy receiving devices 12A–12D are shown as camera-type devices. In the illustrated example, the EM energy receiving devices 12A–12D are configured to receive EM energy within the visible, ultraviolet, and/or infrared portions of the EM spectrum. However, it is to be appreciated that the EM energy receiving devices 12A–12D may configured to receive various other portions of the EM spectrum. Also, it is to be appreciated that one or more active EM transmitting devices (e.g., visible, ultraviolet, and/or infrared) could be used for a specific purpose of providing a certain light for reflection back to the EM energy receiving devices 12A–12D.

Each EM energy receiving device (e.g., 12A) processes the received EM energy to isolate one or more spatial phase components of the EM energy. In the illustrated example, the processing involves separating the EM energy based upon spatial phase characteristics.

The spatial phase components are provided to a central processing unit 18 via operative connections 20A–20D to the EM energy receiving devices 12A–12D. The spatial phase components are processed by the processing unit 18 to derive information concerning the sports participants, the sports articles, and the venue. For example, each sports participant is identifiable via the information conveyed via the spatial phase properties of the EM energy that proceeds from the sports participant to the EM energy receiving devices 12A–12D. Further, the movements of each identified sports participant are recognizable via the information conveyed via the spatial phase properties of the EM energy that proceeds from the sports participant to the EM energy receiving devices 12A–12D. The recognition of movements of each sports participant may be enhanced via the use different spatial phase properties associated with different portions (e.g., arms, legs, torso) of the sports participant. Also, the relationship of a sports participant to the venue (e.g., boundary lines or other locating marks) is discernable via information conveyed via the spatial phase properties of the EM energy that proceeds from the venue and the sports participant to the EM energy receiving devices 12A–12D.

The processing unit 18 performs one or more procedures that utilize the conveyed spatial phase information. For example, the processing unit 18 generates an image and outputs an image feed 24 for display. The provision of the image feed 24 may be for real-time imagery or for storage to provide delayed imagery. The image may be a visible light image that has been enhanced via the use of the conveyed information.

As another example, the processing unit 18 utilizes the information convey via the EM energy to monitor, track, and analyze the movements of the sports participants and articles. Information derived from the determinations and analysis is stored in a storage memory 26 (e.g., a database) for subsequent retrieval and computation. Within the processing unit 18, the analysis typically includes, but is not limited to, determinations and categorizations about sports participant or article movement types, speed, acceleration (quickness), impact force, and the like. The analysis may optionally also be extended to include, but is not limited to, determinations and categorizations regarding success, strength, weakness, fatigue (changes is statistics of a sports participant during the course of a sporting activity), of the sports participants. Some examples of the further analysis includes determinations of an injury recovery factor (statistical analysis of changes in participant performance after an injury and during recovery), success of a participant for certain maneuvers (plays in a playbook), success of a participant for certain conditions (environmental), success against certain opponents, tendencies of movement for various factors (maneuvers, conditions, opponents, and the like). Even the participants themselves are tracked (e.g., substitutions).

The sport itself has features that are analyzed via information conveyed via the spatial phase of the EM energy and discerned via analysis. For example, speed (location and time) of a moving sports article or object (a thrown ball), orientation and timing of the sports object (spin of a thrown ball), spacing and timing of sports participants (available openings for potential progress of a sports participant). The compilation of information leads to statistical analysis such as the number of similar sports team activities (plays), and success of the activities for various factors (location, time, environmental, and the like). In general, it is to be appreciated that the present invention is not to be limited by the type, amount, etc. of analysis that is performed using the information that is conveyed via spatial phase of the EM energy.

Focussing for the moment on the example sport of football that is associated with FIG. 1, the analysis of each play in the football game could include play set (initial location of each sports participant), success factor (yards gained), type (passing/running), ball handling participants (quarterback, running back, pass receiver), fumble/recovery by participant, number/type of plays executed, and the association of game time to the items analyzed.

Figure 2:
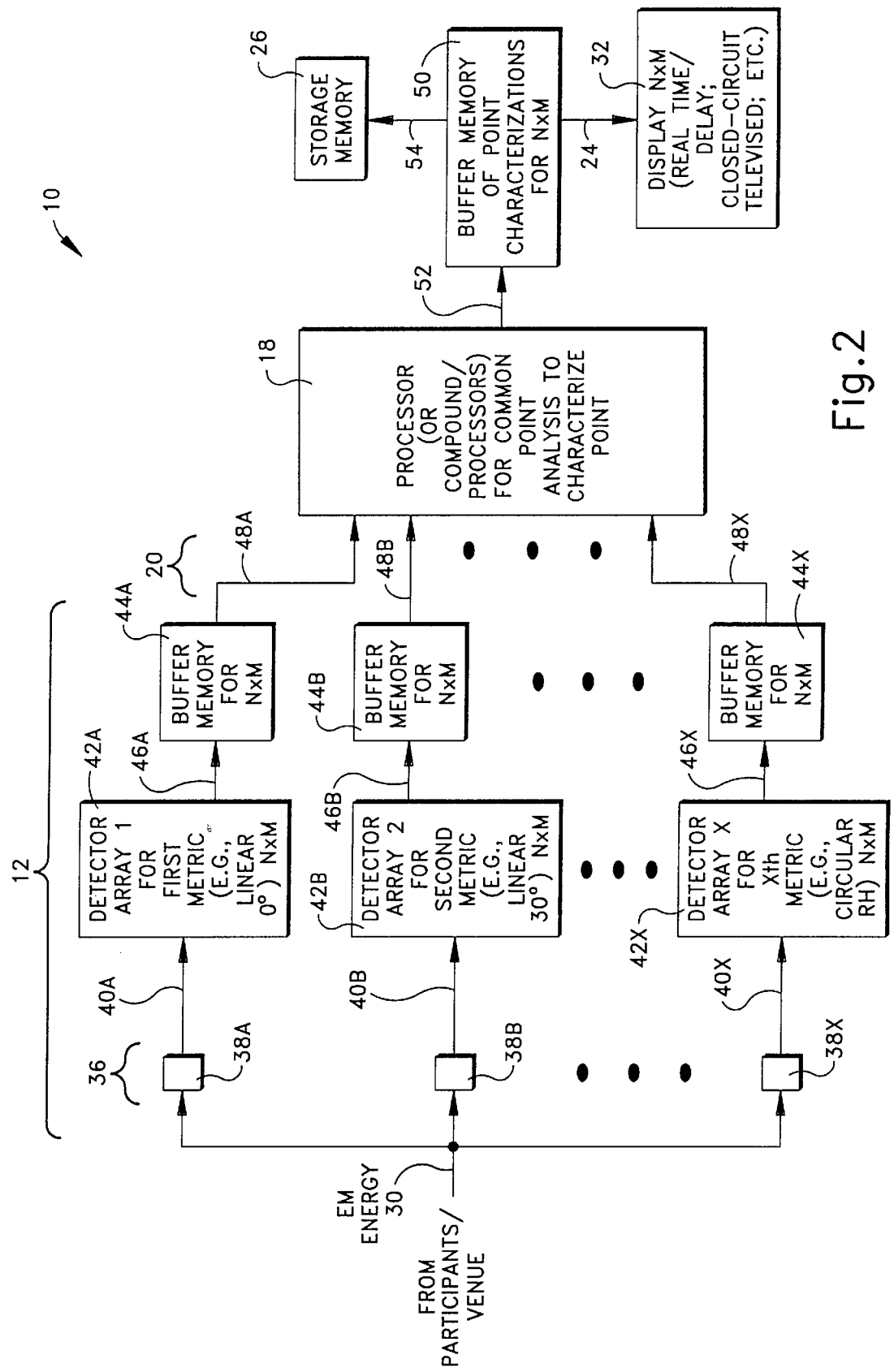
FIG. 2 is schematic block diagram of a portion of the system of FIG. 1.

One example of particulars of the system 10 is schematically shown in FIG. 2. In the illustrated example, only a single EM energy receiving device (generically identified by reference numeral 12) is discussed. It is to be appreciated that similar components and processes are provided for the other EM receiving units. Also, it is to be appreciated that some processing is based upon the use of information derived from a plurality of EM receiving devices. It is to be noted that some of the example details of the system 10 shown in FIG. 2 are generally similar to the invention disclosed in U.S. patent application Ser. No. 09/621,768, filed Jul. 20, 2000, entitled "Apparatus and method of information extraction from electromagnetic energy based upon multi-characteristic spatial geometry processing" to Blair A. Barbour, the teachings of which are expressly incorporated herein.

As one aspect of the example of FIG. 2, the system 10 provides an image of all or part of the sports venue (e.g., the football field), the sports participants, and sports articles on a display 32, utilizing multi-characteristic spatial geometric attributes within received EM energy 30. The image has an appearance dependent upon the operation of the system 10. For example, the image may provide a three-dimensional representation of the sports participants/articles and the venue, a contrast representation, a surface orientation/curvature representation, a material composition representation, or a low light level image (shadow penetration).

In the illustrated example of FIG. 2, an EM energy handling portion 36 receives and handles the EM energy 30 proceeding from the participants/articles and venue. For the portion of the electromagnetic spectrum that is at or near the visible, infrared and/or ultraviolet ranges the EM energy handling portion 36 typically includes optical elements. However, it is to be appreciated that the EM energy handling portion 36 will include components appropriate to receive and handle the portion of the electromagnetic spectrum that is to be utilized. For example, the EM energy handling portion 36 may include one or more antennas or other receiving structures.

The EM energy handling portion 36 specifically includes a plurality of spatial phase separating/isolating/distinguishing components 38A–38X. Each component (e.g., 38A) functions to separate/isolate/distinguish at least one certain, distinct spatial phase attribute or characteristic (e.g., 40A, a polarization characteristic) of the EM energy 30. The separation/isolation/distinction preferably includes spatial slicing of the EM energy 30. It is to be appreciated that the components 38A–38X may comprise any suitable structure appropriate to accomplish the separating/isolating/distinguishing function. Examples of structures include filters (e.g., polarization), small diffraction gratings, wires or the like, optical elements employing surfaces at predetermined orientations (e.g., Brewster's angle), and antenna arrays. Preferably, different spatial phase attributes or characteristics are separated/isolated/distinguished via each component (e.g., 38A). In sum, each component (e.g., 38A) provides a version or representation of an image of the viewed scene (the venue and the participants), as perceived in the realm of the distinct spatial phase attribute(s) or characteristic(s) associated with that component.

A plurality of detector arrays 42A–42X is provided within the system 10 and is associated with the plurality of separating/isolating/distinguishing components 38A–38X. Each detector array (e.g., 42A) detects EM energy having a certain spatial phase attribute or characteristic. Examples of detector arrays include CCD and FPA.

Preferably, each detector array (e.g., 42A) detects the certain spatial phase attribute or characteristic associated with an associated separating/isolating/distinguishing component (e.g., 8A). Each detector array (e.g., 42A) has a plurality of spatially segregated locations (e.g., pixels) at which a spatial phase metric value is quantified. It is to be appreciated that although the example embodiment has plural detector arrays, the same function could be accomplished via division of a lesser number (e.g., one) of detector arrays into a plurality of portions (e.g., sub-arrays of pixels). Also, it is to be appreciated that the division may even be at the singular pixel level.

The spatial phase metric is a value of the spatial phase characteristic at that pixel for the spatial phase characteristic associated with that particular detector array (e.g., 42A) or detector array portion. In the illustrated example, each detector array (e.g., 42A) is an N by M array. Accordingly, the spatial phase metrics provide an N by M map of the characteristic. Further, it is to be appreciated that all of the detector arrays 42A–42X, or detector array portions, are related such that each spatially separated point (e.g., pixel) at each detector array (e.g., 42A), or detector array portion, is related in a group to a corresponding spatially separated point (e.g., pixel) within each of the other detector arrays (e.g., 42B–42X), or detector array portions. Thus, different N by M maps are provided for the different characteristics.

Suitable means 44A–44X are operatively connected 46A–46X for holding/passing the determined spatial phase metric values associated with the plurality of the pixels of the detector array 42A–42X. In the illustrated example, such a function is provided by a buffer memory (e.g., 44A) that is operatively connected (e.g., 46A) to a respective detector array (e.g., 42A).

The plurality of buffer memories 44A–44X is operatively connected 48A–48X to the processing unit 18. The connections 48A–48X collectively are the connection 20 proceeding from the EM energy receiving device 12 to the processing unit 18. In the illustrated example, the processing unit 18 is a single processor. However, it is to be appreciated that compound or parallel processors may be employed.

As one function, the processing unit 18 determines an imaging value for each group of pixels that correspond among the detector arrays 42A–42X. The imaging value is utilized to provide a portion of the image that is provided on the display 32. The imaging values that are determined by the processing unit 18 are provided to the display 32 by any suitable means 50. In the illustrated example of FIG. 1, the means 50 is shown as a buffer memory 50 that is operatively connected 52 to the processing unit 18. The buffer memory 50 holds/passes point characterizations of an M by N matrix of the display 32. The buffer memory 50 is also operatively connected 54 to the storage memory 26.

Focusing on the operation of the processing unit 18, the unit determines the imaging value for each pixel by mathematical processes that are performed upon the spatial phase metric values of each associated group of pixels. The processing differs dependent upon the polarization characteristics that are received at each of the detector arrays 42A–42X. The processing also differs dependent upon the number of detector arrays 42A–42X that are included within the system 10. Regardless of these variable aspects, the processing is based upon the realization that spatial phase characteristics that are present within EM energy retain information (e.g., a history of the origin and propagation of the EM wave). The EM energy has a unique signature that is exploited by separation for the plurality of detector arrays 42A–42X, the spatially separated (e.g., pixel) detection at the detector arrays, and the processing within the processing unit 18. Accordingly, any suitable equation base, such as a stoke-equation base, may be utilized to process spatially separated spatial phase metric values. Thus, spatial phase characteristic metric values, provided via the detector arrays 42A–42X, are used to create the image.

Also, it is to be appreciated that the processing may include first-level processing that generates spatial phase characteristic metric values using the spatial phase metric values that are provided via the detector arrays 42A–42X. Each particular type of generated spatial phase characteristic metric value may be provided in a complementary size matrix. The generated spatial phase characteristic metric values, with or without the spatial phase characteristic metric values provided via the detector arrays 42A–42X, are then used to create the image. For example, the spatial phase characteristic metric values provided via the detector arrays 42A–42X may include polarization characteristics (e.g., orientation and degree). The generated spatial phase characteristic metric values may represent shape, material, index of refraction, slope, three-dimensionality, polarization computation, phase geometry, object geometry, or molecular composition.

Figure 3:
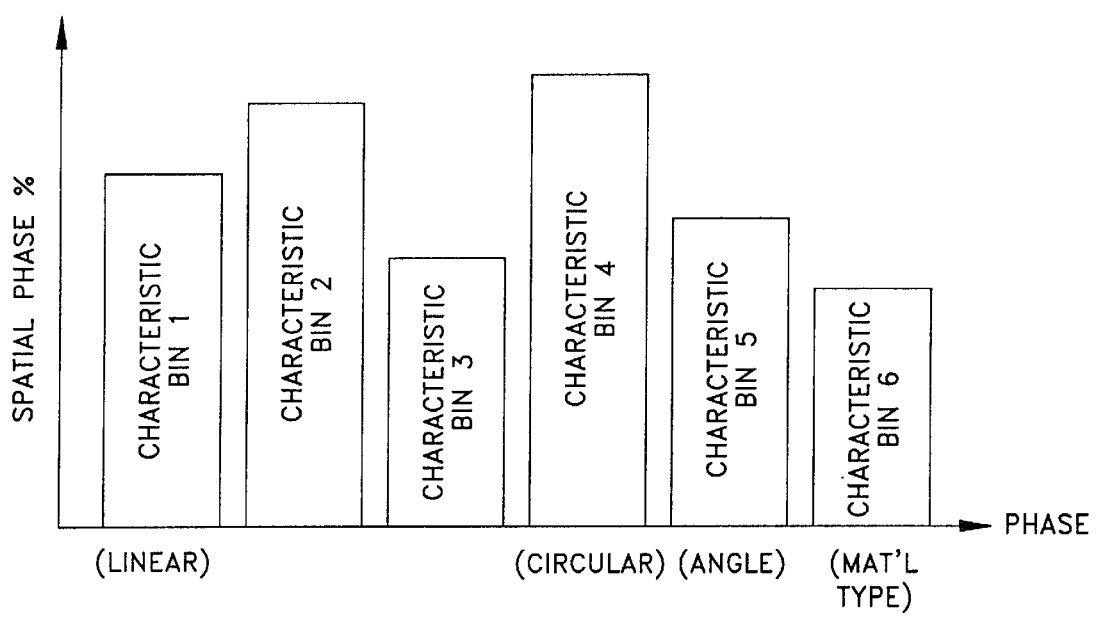
FIG. 3 is a plot indicating examples of spatial phase characteristics.

FIG. 3 is a graphical example that illustrates spatial phase characteristics that may be associated with a single location (e.g., pixel). In the example, the characteristics are separated by identifiers that are also referred to as bins. Further, the bins include polarization characteristics (e.g., the first four bins), angle, and material.

Turning again to FIG. 2, it is to be appreciated that various physical embodiments may be utilized to separate the spatial phase characteristics. Further, it is to be appreciated that various spatial phase characteristics may be separated. The embodiments may differ dependent upon the number of separations desired and the separations that are accomplished. It is to be appreciated that the desired type and number of separations is related to the number and type of detector arrays 42A–42X, and more importantly the type of processing that occurs within the processing unit 18.

Figure 4:
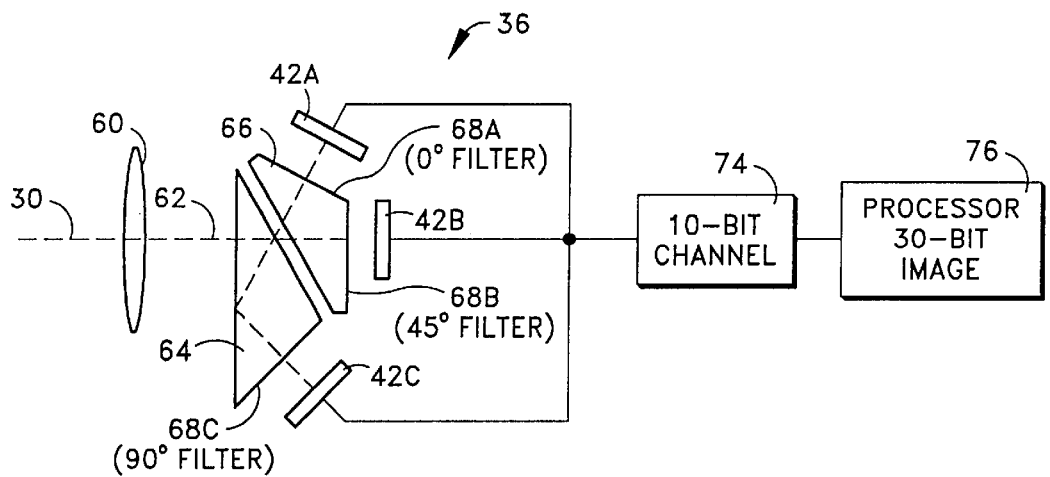
FIG. 4 is an illustration of an example embodiment of an optical system that may be used to provide a function of separating a plurality of spatial phase characteristics for provision to a plurality of detector arrays shown in FIG. 2.

Accordingly, FIG. 4 illustrates an example of one optical arrangement that provides the function (i.e., provide separated spatial phase characteristics) of the EM energy handling portion 36 of the system 10 of FIG. 2. Specifically, the separated spatial phase characteristics include polarization characteristics. However, it is to be appreciated that the example of FIG. 4 is not a limitation of the EM energy handling portion 36 and is not a limitation of the subject invention, but is merely one example embodiment of the EM energy handling portion 36.

The optical system is utilized within an embodiment of the EM energy receiving device 12 that has three detector arrays (i.e., 42A–42C). It is to be appreciated that a different number of detector arrays may be used.

EM energy (e.g., light) 30 is received at an optic arrangement 60, which may be a multi-element, sequential lens arrangement. The EM energy 62 that proceeds from the optic arrangement 60 is provided to a first polarimetric prism 64. A second polarimetric prism 66 is located adjacent to the first polarimetric prism 64. The first-third detector arrays 42A–42C are located adjacent to first-third exit surfaces 68A–68C of the prism pair 64 and 66.

The prisms 64 and 66 cooperate to separate the EM energy into three components. It should be appreciated that each component is representative of the entire viewed area. The first component is directed to the first exit surface 68A, which is on the second prism 66. The second component is directed to the second exit surface 68B, which is on the second prism 66. The third component is directed to the third exit surface 68C, which is on the first prism 64.

Figure 5A:
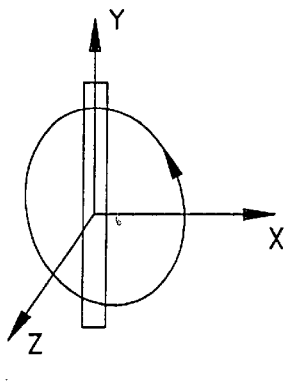
FIGS. 5A–5C are graphical representations of example spatial phase characteristics that may be separated by the optical system of FIG. 4.
Figure 5B:
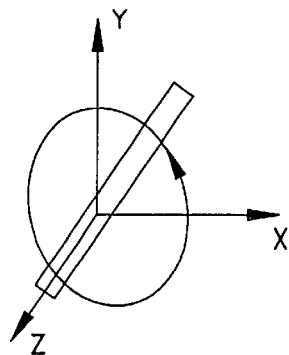
Figure 5C:
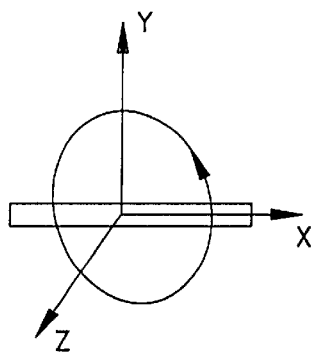

Each path and subsequent exit surface provides a phase/polarization filtering effect that permits passage of only a certain polarization characteristic of the EM energy. For example, the first phase/polarization filtering effect passes only linear polarization at a zero degree phase. Such a polarization characteristic is illustrated by the graphic of FIG. 5A. The second phase/polarization filtering effect passes only linear polarization at a 45° phase. Such a polarization characteristic is illustrated by the graphic of FIG. 5B. The third phase/polarization filtering effect passes only linear polarization at a 90° phase. Such a polarization characteristic is illustrated by the graphic of FIG. 5C. Accordingly, in the example of FIG. 4, each beam has a different "slice" of the overall spatial properties of the EM energy 30.

Turning again to FIG. 4, the EM energy from the first exit surface 68A proceeds to the first detector array 42A. Similarly, the EM energy from the second exit surface 68B proceeds to the second detector array 42B. Also, the EM energy from the third exit surface 68C proceeds to the third detector array 42C.

It should appreciated that the provision of the EM energy onto the detector arrays 42A–42C is such that there is a point-by-point (e.g., pixel-by-pixel) correspondence between all of the detector arrays. In other words, each certain pixel position at each detector array (e.g., 42A) corresponds to an identical certain pixel position at all of the other detector arrays (e.g., 42B and 42C). Thus, the dissected polarization characteristics for each pixel can be processed within the processing unit 18 (FIG. 1). In the illustrated example, a 10-bit multi-division channel unit 74 is operatively connected to the three detector arrays 42A–42C. In turn, the unit 74 is operatively connected to a 30-bit image processor 76.

It should be appreciated that the imaging components may have various different forms and arrangements. For example, other variations may include various filters, prisms, wave plates, Brewster's plates, gratings, and the like. None of such possible variations are to be considered as a strict limitation of the scope of the invention.

Again, turning to the system 10 of FIG. 2, the processing unit 18 utilized the mapping created by the separation. Specifically, the processing unit 18 performs the mathematical process on the polarization metric values within the group for each pixel location to provide an image value that will be displayed to create the image at the display 32 for the certain pixel location.

The ability of the system 10 to provide the image is based upon the fact that the EM energy proceeding from each sports participant has some difference in spatial phase characteristics. The ability to differentiate each sports participant, or even bodily portions (e.g., arms) of a single sports participant, is enhances via the use of tags on the sports participants that provide predetermined spatial phase characteristics. It is not so important as to what the differences in the characteristics are, but it is that a difference exists.

Figure 6:
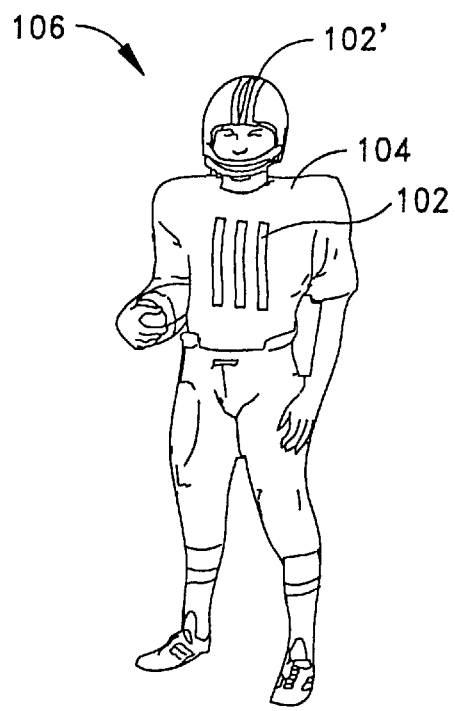
FIG. 6 is schematic representation of an example sports participant with an example of a wearable article that provides a spatial phase-based identification.

FIG. 6 illustrates one example of a spatial phase tag 102 provided on an article (e.g., a football jersey) 104 worn by a sports participant (e.g., a football player) 106. In the example, the football player 106 has three vertical stripes located on the front of his jersey 104. The stripes provide the tag 102, which is recognizable, via spatial phase information, on several levels. The size, orientation, and spacing of the tag 102 are recognizable via spatial phase discrimination. Also, additional tags 102' could be placed elsewhere on the football player (e.g., on the helmet).

In one respect, the example tag 102 could be considered to be similar to the bar code identifications that are in common use today. However, unlike the bar codes, the tag 102 need not have overtly visually apparent characteristics. Specifically, because the recognition is via spatial phase discrimination, there is no need, per se, for the tag 102 to be visually apparent. Thus, although the three stripes of the tag 102 are visible in the drawing for the purposes of illustration and understanding, it is to be appreciated that in practice the stripes may not be overtly visible and may even be independent of the colors, numbering, etc. that are present in the jersey 104.

Further, the material, per se, of the tag 102, in whole or in part, can be recognized via spatial phase discrimination. The tag 102 is comprised of any material, pattern, or the like of the article so that, via analysis of spatial phase information, the football player 106 is readily identifiable. It is to be understood that the composition of the tag 102 is not to be a limitation, but merely needs to have a predetermined spatial phase characteristic. For example, the material may be provided via a thin film(s), paint(s), ink(s), plastic applique(s), fabric applique(s), etc. The three stripes may have any readily identifiable spatial phase characteristic (e.g., polarization). The three stripes may even have three different readily identifiable spatial phase characteristics (e.g., linear polarization with three different orientations).

Also, the three stripes provide three different items that can be monitored to identify further specifics of motion of the sports participant. For example, the stripes will indicate motion (e.g., turning) of the torso. This leads to a very exciting segment of the present invention that deals with identifying, tracking, and the like of the kinematics of the body of the sports participant. The motions of the body of a sports participant are of course identifiable via identifying the different spatial phase characteristics associated with different body parts. This process is enhanced via the use of a plurality of spatial phase tags located on various body parts (e.g., arms and legs). In one respect, the tracking of relative movement of the plurality of tags is indicative of the relative motion of the body parts on which the tags are located.

Figure 7:
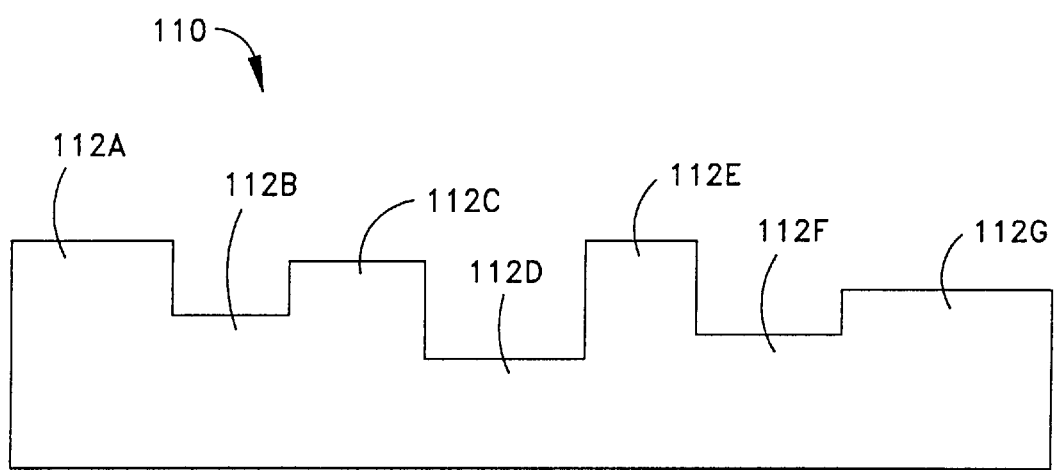
FIG. 7 is a schematic representation of an example tag that provides a spatial phase identification.

FIG. 7 illustrates one example of a tag 110 comprised of thin film that has several portions 112A–112G, with each portion having a different thickness. Each thickness provides a different spatial phase characteristic, and thus can be recognized via spatial phase discrimination. The particulars of the difference are not overly important, but rather the existence of the identifiable spatial phase characteristics is important.

Although tagging is useful to enhance the identification ability of the system, it is to be realized that tagging of the sports participant or the sports article/object (e.g., a ball) is not necessary. The spatial phase characteristics from the sports participant or the sports article/object, per se, are usable. In other words, the sports participant or the sports article/object, per se, is the article associated with the sport that provides spatial phase characteristics. So long as the proper spatial phase characteristics are tracked, the sports participant or the sports article/object can be tracked. Thus, use of the proper spatial phase characteristics effectively results in that/those spatial phase characteristics being known.

Of course, it is to be realized that the processing and analysis of the sports participant information derived from the information conveyed via the spatial phase characteristics of the EM energy leads to a plethora of detail information. This ability to provide information is due to the ability to readily identify location and motion of the participants, via spatial phase analysis.

Some possibilities for the present invention include reconstruction of surface geometry (3-D) via constant phase contrast (which is typically constant for polarization), and penetration of poor illumination (shadows) via amplitude-independent (intensity-independent) processing. It is contemplated that spatial phase could be used in conjunction with other systems to add discrimination ability. For example, spatial phase technology accordingly to the present invention can be effectively added to any sensor to expand that sensor capability to include phase information. Further, imaging data derived via the spatial phase technology accordingly to the present invention can be merged or fused with imaging data derived via other methods (e.g., regular imaging, infrared imaging) to provide an enhanced image.

Still further, the three dimensional imaging ability that the present invention provides lends itself to a myriad of possibilities such as real-time contour display or the like. The spatial phase ability of the present invention is also useful for feature extraction and classification. Such specific application could entail pattern recognition, image enhancement, and scene analysis. As mentioned, movement of sports participants, articles objects (e.g., a game ball, a bat, a club, a racket), or the like can be monitored via the use of a spatial-phase identification marker or tag. In general, the processing and analysis (e.g., image creation) utilizing spatial phase characteristics is not subject to the limitations associated with various known techniques.

One immediately identifiable beneficiary of such derived information would be a coach of a sports team. A coach could become more productive because of the ability to make decisions based upon scientific data acquired, analyzed, and presented via the processing. The data is available in real-time during the sports activity, so that the coach could continuously evaluate the sports participants.

A coach could also analyze the data after the sports activity. This analysis allows a coach to understand strengths and weaknesses of the players. Also, if data is available for a future opponent sports team, the coach will be able to understand strengths and weakness of the other team. This would lend itself to optimizing match-ups and exploiting weaknesses.

The processing and analysis may include re-enactment or re-drawing of the sports event. Also, the perspective of the re-enactment or re-drawing may be modified. For example, an over head perspective or a participant point of view perspective may be provided. Turning back to the football example, a left guard could be shown a previous football game from a perspective of a left guard.

It is contemplated that the information derived via the processing and analysis could be of commercial value. The information could be sold or licensed to broadcaster (e.g., television and radio) and the like (e.g., cable, satellite, and internet providers). The information could also be provided in a catalog or playbook format. Such formats could be useful to all levels of sports participation, but could be particularly useful for a lower level of participation (e.g., scholastic or recreational) seeking to learn technique from a higher level of participation (e.g., professional or collegiate).

Figure 8:
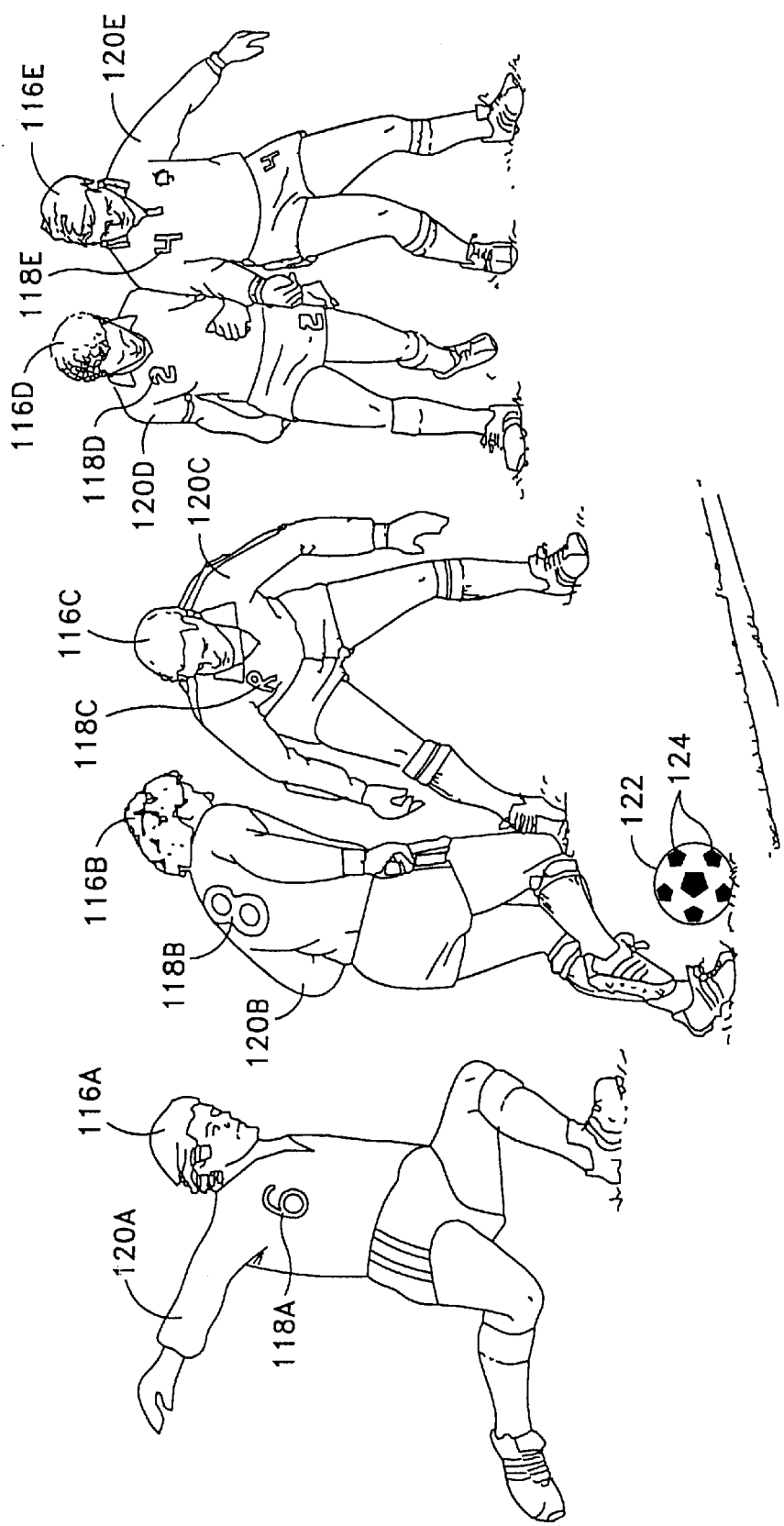
FIG. 8 is a schematic representation of another example sport, and also shows an example of participant identification tagging.

It is to be understood that the present invention is not to be limited to any one kind of sport. Also, the EM reception type and the use, or the lack of use, of tags are not to be considered limitations. For Example, FIG. 8 illustrated a soccer (European football) game. The sports participants 116A–116E, including the referee 116C, have visual identification alphanumeric characters (e.g. numerals) 118A–118E located on their shirts 120A–120E. The characters 118A–118E are constructed of material(s) that are readily identifiable via spatial phase characteristics and are thus tags. Also, the ball 122 has markings 124 that are readily identifiable via spatial phase characteristics. The marking of the ball 122 again emphasizes the aspect that sports objects/articles have motion that can be monitored, tracked, analyzed, and the like. Further, the marking of a sports article, such as the ball 122, allows for high-speed motion analysis. In this specific example, when the ball 122 is kicked the ball travels at a relatively high speed and may have a relatively high rate of rotation. These motions of the ball 122 are easily observed via monitoring relative motion of the spatial phase markings 124.

Figure 9:
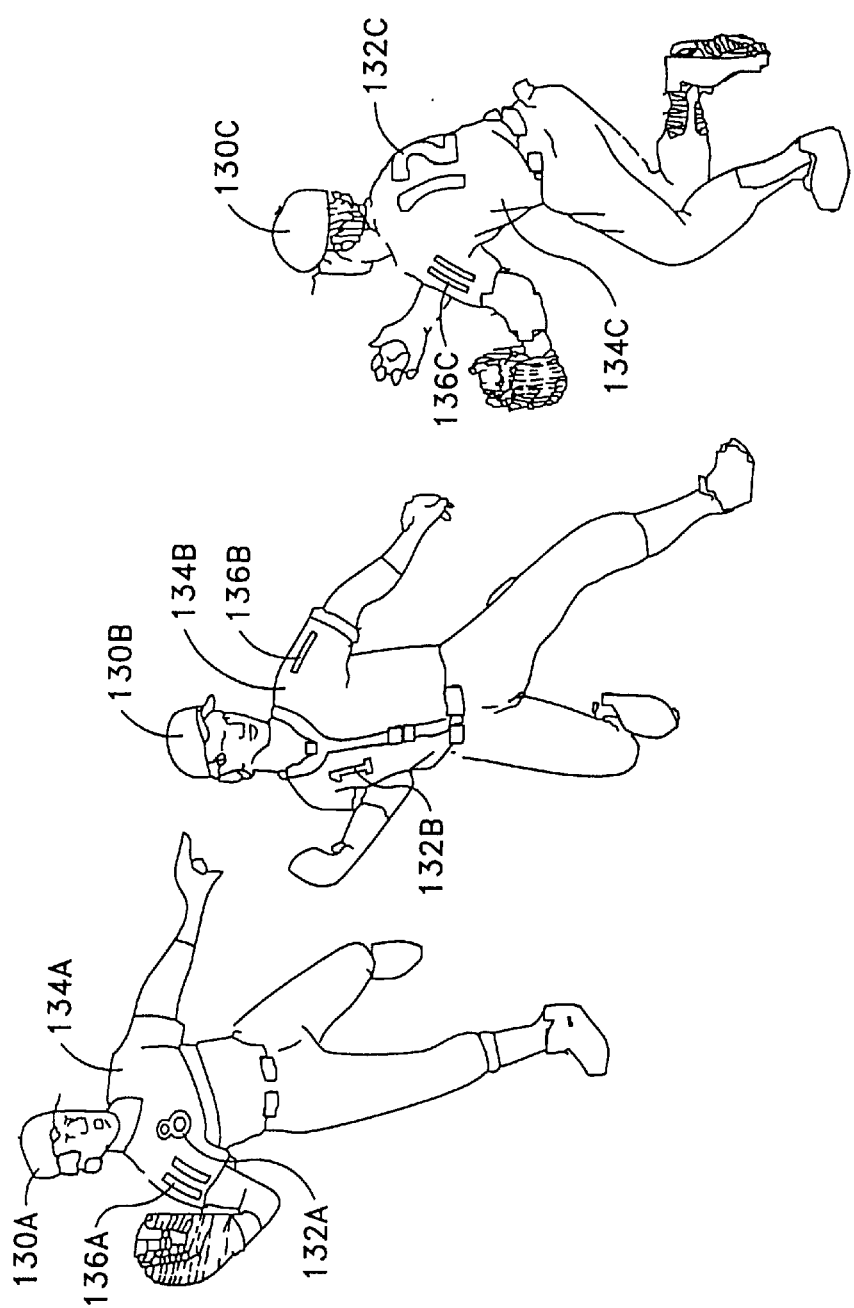
FIG. 9 is a schematic representation of another example sport, and also shows another example of participant identification tagging.

FIG. 9 illustrated a baseball game. The sports participants 130A–130C have visual identification numerals 132A–132C located on their shirts 134A–134C. The numerals 132A–132C are constructed of material(s) that are readily identifiable via spatial phase characteristics and are thus tags. Additional tags (vertical stripes) 136A–136C are provided in the shirtsleeves to help identify opposing teams and also to help identify motion of the arms of the players. As an additional feature, it is contemplated that each digit of a multi-portion numeral may have a different spatial phase characteristic.

Figure 10:
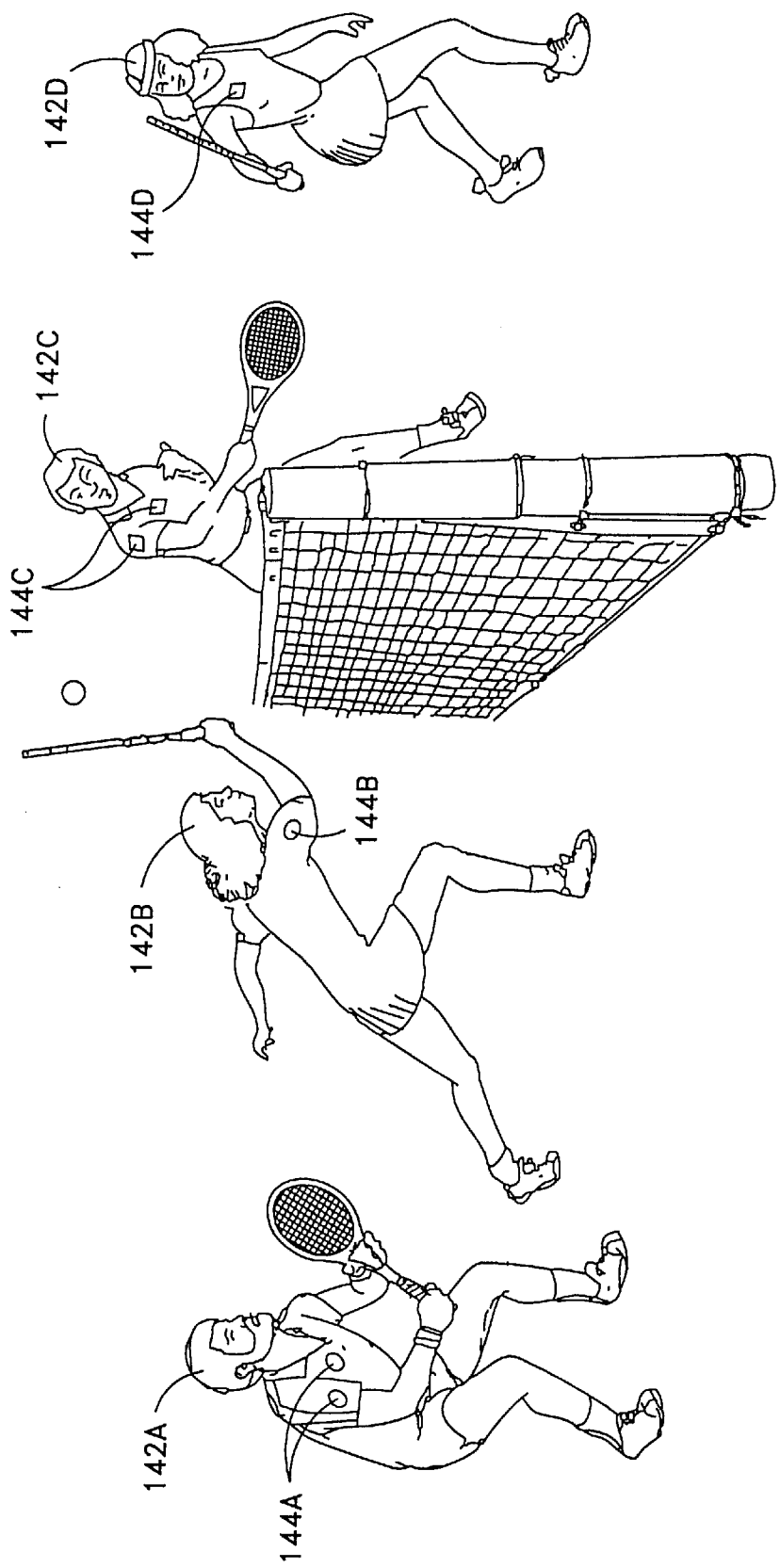
FIG. 10 is a schematic representation of still another example sport, and also shows another example of participant identification tagging.

FIG. 10 illustrated a tennis match. The sports participants 142A–142D have minimal spatial phase tags 144A–144D. In the illustrated example the tags (e.g., circles and squares) 144A–144D are provided on the clothing of the participants 142A–142D. However, it should be noted that the tags 144A–144D might be optional. The option to use tags for the illustrated example of tennis, or any other sport, may dependent upon such factors as the amount of intermingling of the sports participants during the action of the sporting event and the amount of motion tracking/analysis is desired.

Figure 11:
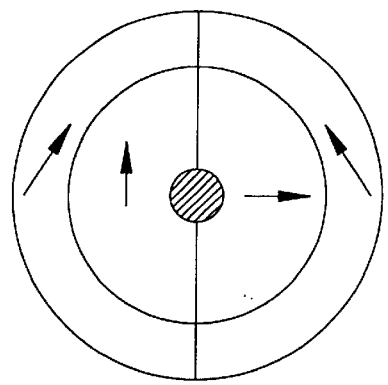
FIG. 11 is a schematic representation of one specific example configuration of a tag that provides a spatial phase identification.

Turning to one variation of the tags of the geometry shown in FIG. 10, the tags themselves may have a somewhat complex spatial phase pattern such that the tags are even more readily identifiable. FIG. 11 shows one example that has a general circular shape. Concentric portions have different spatial phase characteristics. Also, each concentric portion is divided (e.g., bisected) to have different spatial phase characteristics. In the illustrated example, the arrowheads represent different linear polarization orientations. Finally, a center-most portion is provided to be devoid of chosen spatial phase characteristics and is thus considered to be "black hole" of the spatial phase characteristics.

Of course such a tag is usable for any sport, and not just tennis as shown in FIG. 10. Further, it should be realized that use of a plurality of such tags, and moreover the use of a plurality of differing tags leads to enhances abilities to track motions (e.g., participants and body parts of the participants and sports articles/objects).

Figure 12:
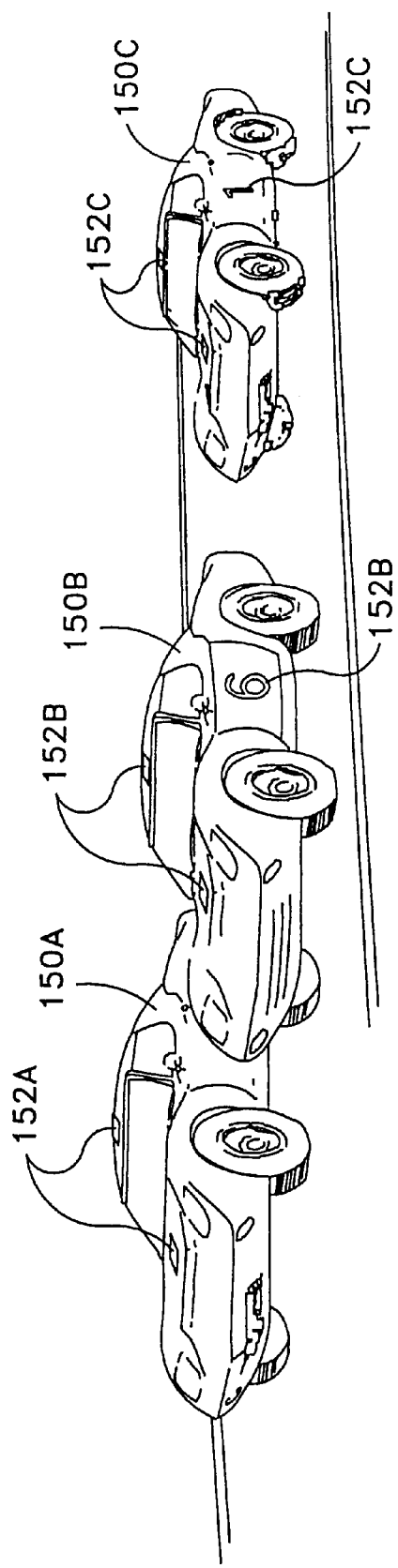
FIG. 12 is a schematic representation of still another example sport, and also shows a different example of identification tagging.

FIG. 12 illustrated a vehicle race. The vehicles 150A–150C in the race have spatial phase tags 152A–152C. In the illustrated example the tags 152A–152C are provided as visual identification numbers (on the vehicle doors) and geometric shapes (on the hood and roof). The example of FIG. 12 is provided to show that the tags need not be directly worn by the sports participants (i.e., the vehicle drivers). Also, the example of FIG. 12 is provided to show the breadth of diversity of sports that are contemplated. Specifically, the breadth is not limited to human participants. Other possibilities include horse racing and dog racing.

Accordingly, it is to be understood that the present invention is applicable to any sport. It is to be understood that sport is to be given a broad interpretation. Thus, the scope of possible sports ranges from basketball and handball, to golf and hockey, to horseback riding and cycling, to water diving and sky diving, to water skiing and snow skiing, and to shooting skeet to shooting pool. Of course it should be appreciated this list is not all inclusive of the sports to which the present invention is directed.

Also, the movement is not limited to the movement during a sporting content. For example, the sports movement could be done during training or practice. Thus, sport is to be considered to cover physical motion that is typically associated with or leads to use within a sport. Some examples include exercising, stretching, and weight lifting.

Figure 13:
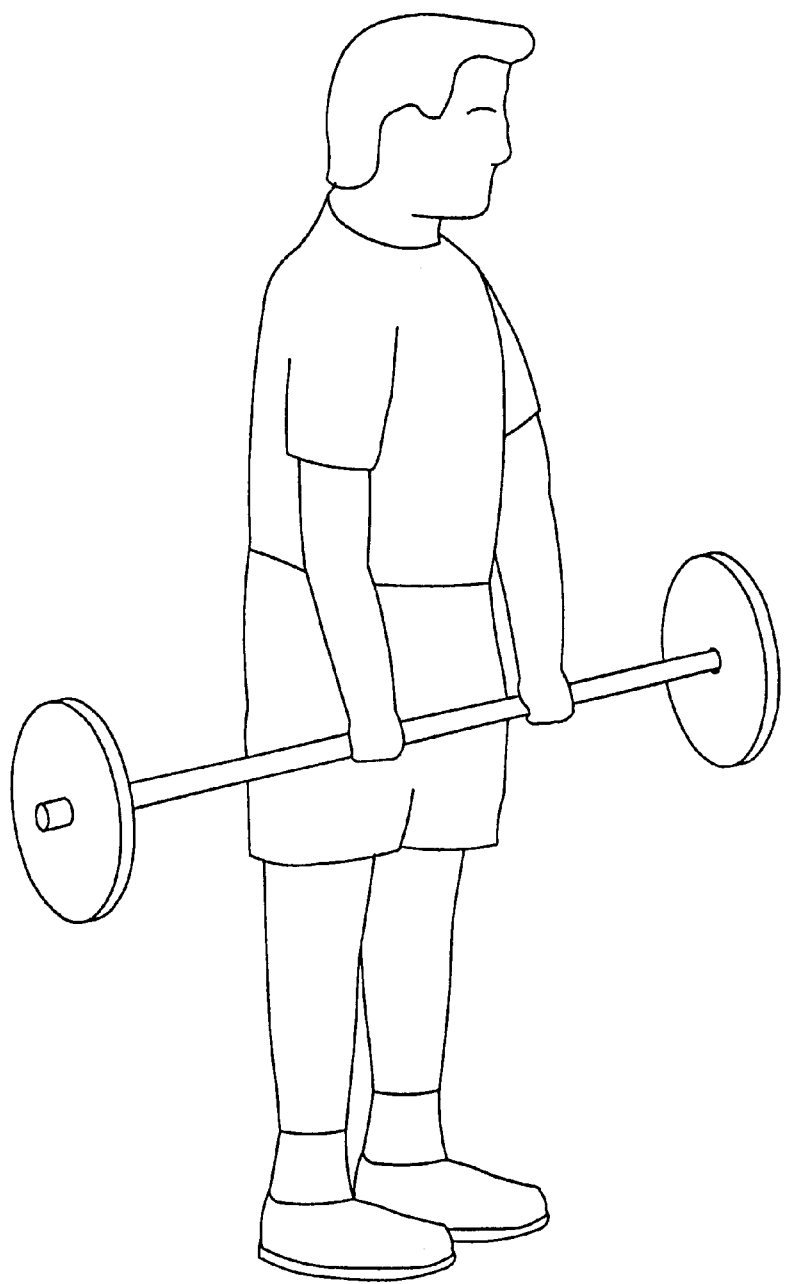
FIG. 13 is a schematic representation of still another sports participant engaged in a sport related activity.
Figure 14:
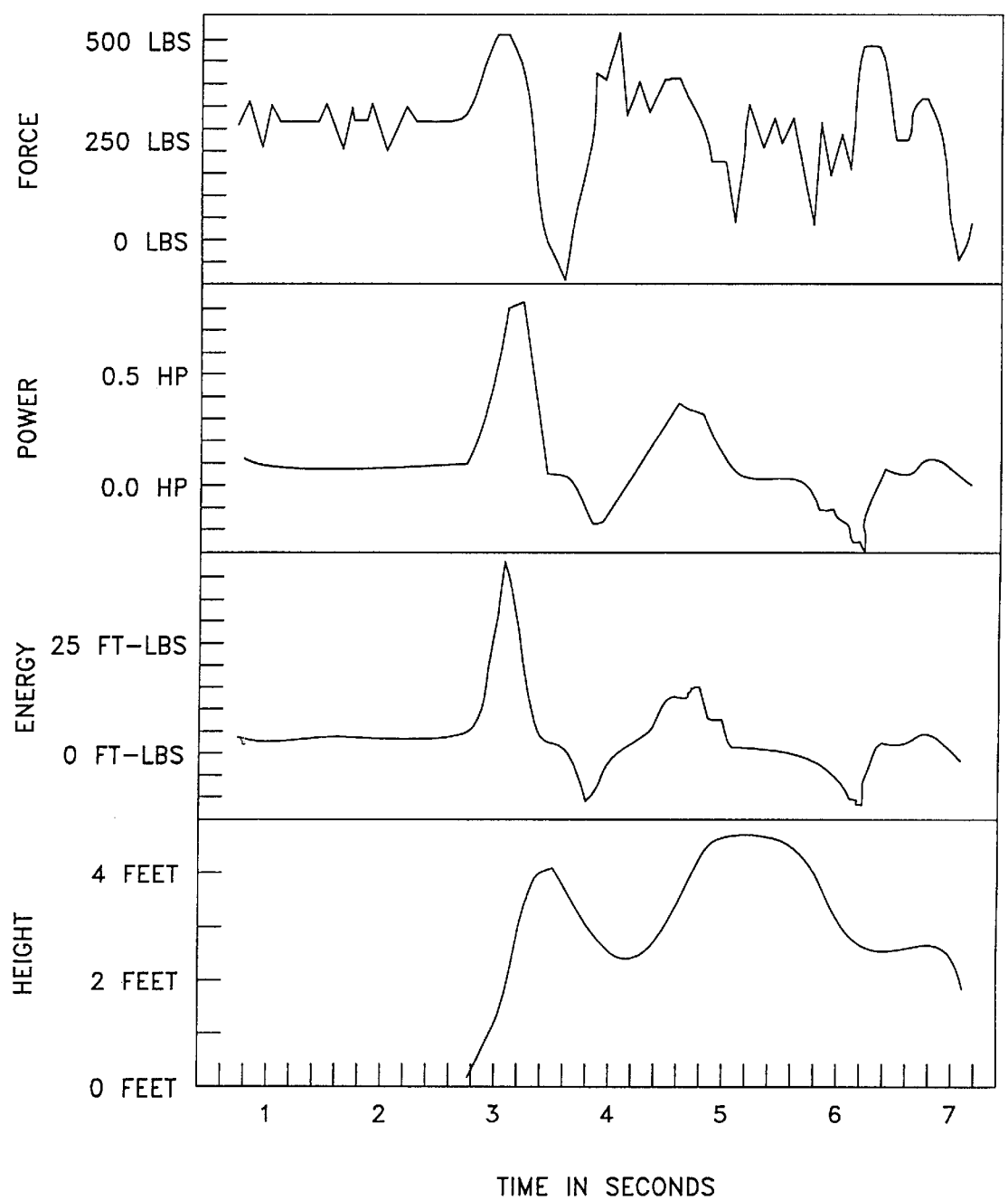
FIG. 14 is graphic generated via processing of information derived from sport motion analysis for movement of the sports participant shown in FIG. 13.

FIG. 13 illustrated the example of weight lifting. Weight lifting is itself a sport, but is also used for strength training for many other sports. The motion involved in something as straightforward as lifting the weighted bar yields a plethora of information. For example the plots of FIG. 14, which are provided via the present invention, indicate the bar height, exerted energy exerted power, and exerted force during a lifting maneuver. Thus, it is to be appreciated that motion analysis and a wealth of information about the motion are provided as one aspect of the present invention.

From the above description of the invention, those skilled in the art will perceive improvements, changes and modifications. Such improvements, changes and modifications within the skill of the art are intended to be covered by the appended claims.

Having described the invention, the following is claimed:

1. A system for tracking movement that occurs during a sports activity, said system comprising:
   an article, associated with the sport, providing a known spatial phase characteristic conveyed via electromagnetic energy;
   receiver means for monitoring an area within which the sports activity is occurring, said receiver means including means for receiving electromagnetic energy including the electromagnetic energy from said article that conveys the spatial phase characteristic;
   means for identifying the known spatial phase characteristic provided by said article among the spatial phase characteristics of electromagnetic energy to locate said article; and
   means for tracking physical movement of said article by tracking the location of said article.

2. A system as set forth in claim 1, wherein said means for tracking physical movement of said article includes means for tracking orientation of said article.

3. A system as set forth in claim 1, wherein said article is a sports participant.

4. A system as set forth in claim 1, wherein said article is a sports object.

5. A system as set forth in claim 1, wherein said sports object is a ball.

6. A system as set forth in claim 5, wherein said sports object is an object for interacting with a ball.

7. A system as set forth in claim 1, wherein said article is a body portion of a sports participant.

8. A system as set forth in claim 1, wherein the sports activity is a sporting competition.

9. A system as set forth in claim 1, wherein the sports activity is an activity performed in preparation for sporting competition.

10. A system as set forth in claim 1, wherein said means for tracking physical movement of said article includes means for tracking the location of said article relative to a sports background.

11. A system for tracking movement of a sports participant of a sports activity, said system comprising:
   an article associated with the sports participant, said article provides a known spatial phase characteristic conveyed via electromagnetic energy;
   receiver means for monitoring a venue area within which the sports activity is occurring, said receiver means including means for receiving electromagnetic energy including the electromagnetic energy from said article that conveys the spatial phase characteristic;
   means for identifying the known spatial phase characteristic provided by said article among the spatial phase characteristics of electromagnetic energy to locate said article; and
   means for tracking physical movement of the sports participant by tracking the location of said article.

12. A system as set forth in claim 11, wherein said article has a plurality of portions, each portion having a known spatial phase characteristic conveyed via electromagnetic energy.

13. A system as set forth in claim 11, further comprising a plurality of articles, each article being carried by a different sports participant, each of said articles provides a known spatial phase characteristic conveyed via electromagnetic energy, each conveyance of spatial phase characteristic having a different property, said means for receiving electromagnetic energy being also for receiving the electromagnetic energy from said articles, said means for identifying being also for identifying each different property to located said articles, and said means for tracking being also for tracking movements of the sports participants by tracking the locations of said articles.

14. A system as set forth in claim 11, wherein the venue area is a playing field and the sports participant is engaged in sports competition.

15. A system as set forth in claim 11, further comprising a sports activity article used by the sports participant, said sports activity article including a portion that provides a known spatial phase characteristic conveyed via electromagnetic energy, said receiver means having means for receiving the electromagnetic energy from said sports activity article that conveys the spatial phase characteristic, means identifies the known spatial phase characteristic provided by said sports activity article among the spatial phase characteristics of electromagnetic energy, and means tracks physical movement of the sports activity article.

16. A system as set forth in claim 15, wherein said sports activity article is a ball.

17. A system as set forth in claim 11, wherein said article associated with the sports participant is located on a clothing item.

18. A system as set forth in claim 11, wherein said article associated with the sports participant is located on an item used to perform the sports activity.

19. A system as set forth in claim 18, wherein said item upon which said article is located is a vehicle.

20. A system as set forth in claim 11, wherein the sports activity is a non-competition activity.

21. A system for tracking movement of a sports participant of a sports activity, said system comprising:
   receiver means for monitoring an area within which the sports activity is occurring, said receiver means includes means for receiving electromagnetic energy having a plurality of spatial phase characteristics;
   means for separating the plurality of spatial phase characteristics of the received electromagnetic energy;
   means for identifying spatially segregated portions of each spatial phase characteristic, with each spatially segregated portion of each spatial phase characteristic corresponding to a spatially segregated portion of each of the other spatial phase characteristics in a group;
   means for quantifying each segregated portion to provide a spatial phase metric of each segregated portion for providing a data map of the spatial phase metric of each separated spatial phase characteristic;
   means for associating at least one spatial phase characteristic with the sports participant; and
   means for tracking the at least one spatial phase characteristic to identify movement of the sports participant.

22. A system as set forth in claim 21, further comprising an article carried by the sports participant, said article provides a known spatial phase characteristic conveyed via electromagnetic energy, said means for associating at least one spatial phase characteristic with the sports participant includes means for associating the known spatial phase characteristic provided by said article carried by the sports participant.

23. A system as set forth in claim 22, wherein said article has a plurality of portions, each portion having a known spatial phase characteristic conveyed via electromagnetic energy.

24. A system as set forth in claim 21, further comprising a plurality of articles carried by the sports participant, said articles provide known spatial phase characteristics conveyed via electromagnetic energy, said means for associating at least one spatial phase characteristic with the sports participant includes means for associating the known spatial phase characteristics provided by said articles carried by the sports participant.

25. A system as set forth in claim 24, further comprising means for identifying bodily movements of the sports participant by tracking the spatial phase characteristics provided by said articles carried by the sports participant.

26. A system as set forth in claim 21, further comprising a plurality of articles, each article being carried by a different sports participant, said articles provide known spatial phase characteristics conveyed via electromagnetic energy, and said system further comprising means for associating the spatial phase characteristics with respective sports participants.

27. A system as set forth in claim 21, wherein the sports activity is a competition activity and the sports participant is engaged in the sports competition.

28. A system as set forth in claim 21, wherein the sports activity is a non-competition activity.

29. A system as set forth in claim 21, further comprising a sports activity article used by the sports participant, said sports activity article including a portion that provides a known spatial phase characteristic conveyed via electromagnetic energy, said receiver means having means for receiving the electromagnetic energy from said sports activity article that conveys the spatial phase characteristic, means identifies the known spatial phase characteristic provided by said sports activity article among the spatial phase characteristics of electromagnetic energy, and means tracks physical movement of the sports activity article.

30. A system as set forth in claim 29, wherein said sports activity article is a ball.

31. A system as set forth in claim 29, wherein said sports activity article is a vehicle.

32. A method for tracking movement that occurs during a sports activity, said method comprising:
- providing an article, associated with the sport, that has a known spatial phase characteristic conveyed via electromagnetic energy;
- monitoring the area within which the sports activity is occurring, including receiving electromagnetic energy from the monitored area, the received electromagnetic energy including electromagnetic energy from the article that conveys the spatial phase characteristic;
- identifying the known spatial phase characteristic provided by the article among the spatial phase characteristics of electromagnetic energy to locate the article; and
- tracking physical movement of the article by tracking the location of the article.

33. A method for tracking movement of a sports participant of a sports activity, said method comprising:
- associating an article with the sports participant, the article provides a known spatial phase characteristic conveyed via electromagnetic energy;
- monitoring a venue area within which the sports activity is occurring, including receiving electromagnetic energy from the monitored area, the received electromagnetic energy including the electromagnetic energy from the article that conveys the spatial phase characteristic;
- identifying the known spatial phase characteristic provided by the article among the spatial phase characteristics of electromagnetic energy to locate the article; and
- tracking physical movement of the sports participant by tracking the location of the article.

34. A method for tracking movement of a sports participant of a sports activity, said method comprising:
- monitoring an area within which the sports activity is occurring, including receiving electromagnetic energy having a plurality of spatial phase characteristics;
- separating the plurality of spatial phase characteristics of the received electromagnetic energy;
- identifying spatially segregated portions of each spatial phase characteristic, with each spatially segregated portion of each spatial phase characteristic corresponding to a spatially segregated portion of each of the other spatial phase characteristics in a group;
- quantifying each segregated portion to provide a spatial phase metric of each segregated portion for providing a data map of the spatial phase metric of each separated spatial phase characteristic;
- associating at least one spatial phase characteristic with the sports participant; and
- tracking the at least one spatial phase characteristic to identify movement of the sports participant.

* * * * *